AUTOMATIC TELEPHONE SYSTEM

Original Filed Jan. 30, 1953 3 Sheets-Sheet 1

INVENTOR.
FRANK KESSLER
BY J. Warren Whitesel
ATTORNEY

July 30, 1957 F. KESSLER 2,801,285

AUTOMATIC TELEPHONE SYSTEM

Original Filed Jan. 30, 1953 3 Sheets-Sheet 2

INVENTOR.
FRANK KESSLER
BY J. Warren Whitesel
ATTORNEY

July 30, 1957 F. KESSLER 2,801,285

AUTOMATIC TELEPHONE SYSTEM

Original Filed Jan. 30, 1953

3 Sheets-Sheet 3

INVENTOR.
FRANK KESSLER

BY J. Warren Whitesel

ATTORNEY

United States Patent Office 2,801,285

Patented July 30, 1957

2,801,285

AUTOMATIC TELEPHONE SYSTEM

Frank Kessler, Los Angeles, Calif., assignor, by mesne assignments, to General Dynamics Corporation, a corporation of Delaware Original application January 30, 1953, Serial No. 334,197. Divided and this application January 7, 1954, Serial No. 409,473

9 Claims. (Cl. 179—27)

Figures 1, 4:
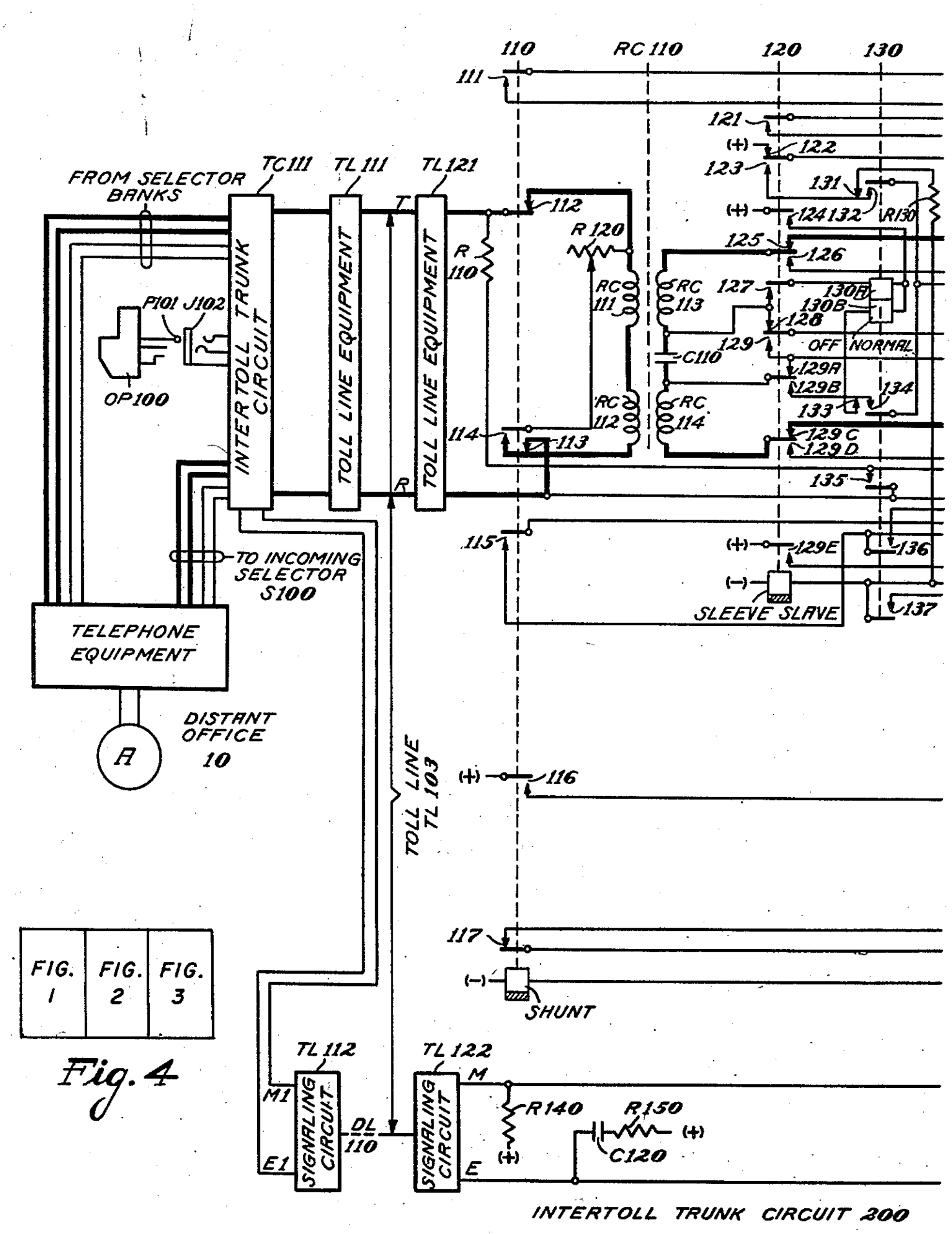
Figure 2:
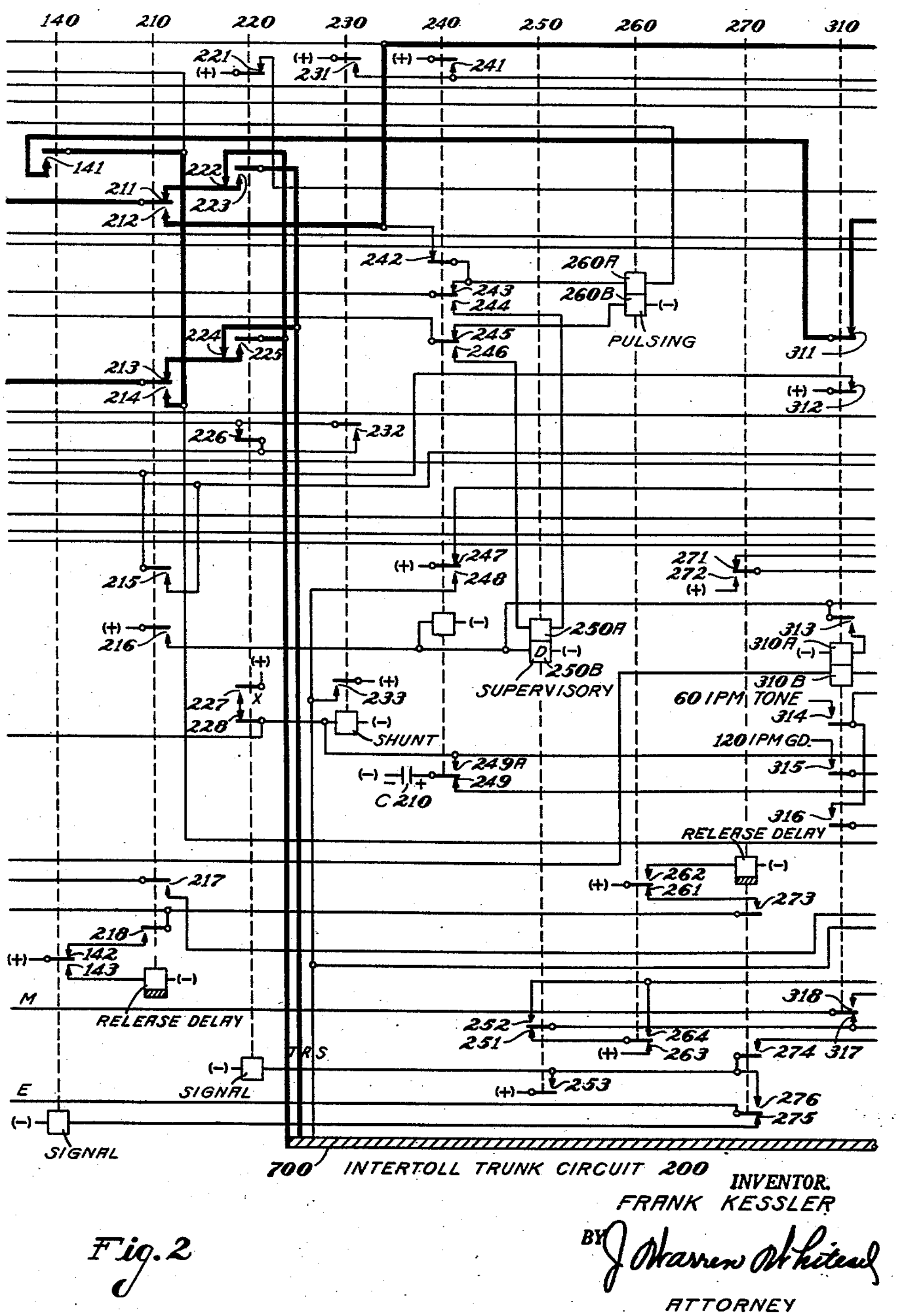
Figure 3:
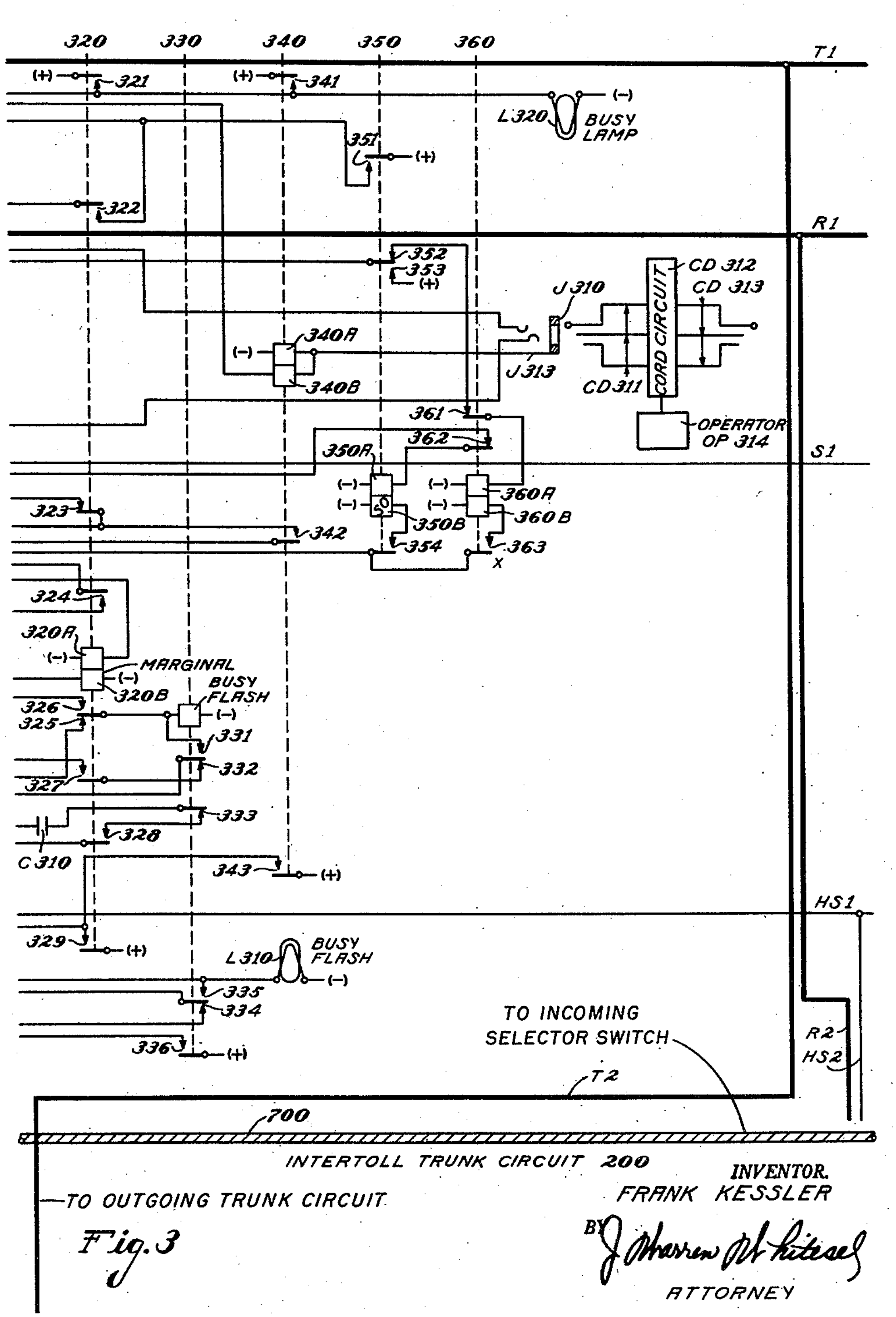

This invention relates to electro-mechanical telephone systems and more particularly to means providing improved pulsing in an intertoll dial system. This invention, which is a division of my copending application Serial No. 334,197, entitled "Automatic Telephone System," filed January 30, 1953, may be used in conjunction with equipment shown in a co-pending application, Serial No. 308,240, filed September 6, 1952, by Leon H. Reagan, now Patent 2,726,285, granted December 6, 1955, both this and the subject application having the same assignee.

Telephone equipment is arranged for both local and distant calls. In the past, distant calls have been handled by a procedure according to which an operator at a first exchange calls an operator at a second exchange; then connected with ground. For this reason, I refer to the negative poles as (—) battery and the positive pole as grounded (+). It should be understood that this condition could be reversed or that any other well-known power source may be used without changing my invention.

Referring now to the drawings, only those portions which are germaine to the present invention will be described in detail herein. For a complete understanding of the entire system, of which the present invention is part, reference should be made to my Patent 2,781,418, granted February 12, 1957.

*Seizure*

The first call to be described is one in which an operator OP100 receives a call in any conventional manner—such as by way of a plug and jack arrangement or automatic switch train, for example (neither of which is shown). She learns that the call is for another office which may be reached by way of a toll line such as TL103, for example. Therefore to forward this call, she first interconnects plug P101 and jack J102 thereby seizing intertoll trunk circuit TC111. The other end of toll line TL103 is signaled by any conventional means so that toll line TL103 may be marked busy thereat, thus preventing the possible interconnection occasioned by two calls seizing the same trunk simultaneously from both ends. These operations may involve any suitable equipment at operator position OP100, such as that shown omitted here, since it does not form part of the present invention, but is described in detail in my above-identified Patent 2,781,418.

*Dialing first digit*

The aforementioned incoming selector switch (not shown) is now prepared to receive switch directing signals. Briefly, the operator at position OP100 proceeds to transmit digit signals in any suitable manner such as by pulsing over conductor M1 and dial leg DL110 to signal circuit TL122 where the signal pulses are repeated to conductor E for pulsing signal relay 140, thereby opening and closing contacts 141 to cause the operation of the incoming selector switch in a manner more fully described in my above-identified Patent 2,781,418.

More specifically, as relay 140 restores intermittently responsive to the incoming pulses on conductor E, slow release shunt relay 110 is energized intermittently from grounded (+) on contacts 142, through operated contacts 218, and the winding of shunt relay 110 to (−) battery. Relay 110 operates and energizes a second shunt relay 230 over a path which may be traced from grounded (+) through operated contacts 116 and the winding of relay 230 to (−) battery. This relay operates to place a multiple marking on busy lamp L320 and on conductor S of cable 700. Electrolytic capacitor C210 is charged from grounded (+) on contacts 116 through operated contacts 249A of switch relay 240; however, this device has no utility at this time. At contacts 112 and 113, shunt relay 110 opens the circuit extending between toll line equipment TL121 and repeating coils RC111 and RC112. Resistor R110 remains connected across the toll line by way of operated contacts 232 and 226 in parallel. This is to compensate for the removal of the repeating coil windings RC111 and RC112 while pulses are being received, and to eliminate the momentary unbalancing effect of intermittent pulses on toll line equipment such as TL111 and TL121, for example. In addition to the foregoing, shunt relay 110 also closes contacts 115 to connect grounded (+) from closed contacts 312 and 115 to outgoing conductor S1 in parallel with contacts 215. This is to hold succeeding equipment in an operated condition. The operation of relay 110 also connects variable resistor R120 across repeating coil windings RC111 and RC112 at operated contacts 114; however, this device has no utility at this time since it relates to the correction of pulsing characteristics on outgoing calls.

Following the receipt of the first pulse train, shunt relay 110 releases after its slow release time interval since contacts 142 remain open after the receipt of the last digit pulse.

*Outgoing call from operator OP314 over toll line TL103*

Intertoll trunk circuit 200 is adapted for outgoing calls destined for operator OP100 as well as for the incoming call explained above. To illustrate such a call, it is assumed that operator OP314 calls operator OP100 over plug CD311 to extend a call which was received in any suitable manner over plug CD313. It is assumed that the equipment leading to plug CD313, cord circuit CD312 and operator circuit OP314 are all conventional equipment.

To extend this call, operator OP314 interconnects plug CD311 and jack J310. Responsive thereto (−) battery is connected from cord circuit CD312 through conductor J313, and winding 340A to grounded (+). Sleeve relay 340 operates to light busy lamp L320 from grounded (+) through contacts 341, and lamp L320 to (−) battery, to guard this circuit against seizure by another operator. Relay 340 also connects grounded (+) through contacts 343 to conductor S to guard this circuit against seizure by an incoming call from the aforementioned selector switch. In addition to the foregoing, relay 340 energizes sleeve slave relay 120 from grounded (+) through normally closed contacts 247 and 323, operated contacts 342, through the winding of relay 120 to (−) battery. Upon operating, relay 120 locks through contacts 129E and 342. At contacts 122, relay 120 also opens the circuit extending ground to winding 260A. However, pulsing relay 260 operates from grounded (+) through operated contacts 129E and 342, resistor R130, normally closed contacts 131, operated contacts 123, through winding 260A, normally closed contacts 243, operated contacts 129, normally closed contacts 245, and winding 260B to (−) battery. Relay 260 operates and energizes release delay relay 270 from grounded (+) through contacts 262, and the winding of relay 270 to (−) battery.

A circuit is now closed for seizing equipment in the distant office over toll line TL103. This signal may light a lamp at operator's board OP100 responsive to which she interconnects a suitable plug and jack; or this signal may seize an incoming selector over conductors S100, in which case dial pulses are necessary to set telephone equipment at the distant office. For the purpose of explaining this invention, it is assumed that an incoming selector is seized.

The seizure signal results from operation of pulsing relay 260 which removes the ground marking from the M lead at contacts 263. A circuit is then closed to connect (−) battery through resistance lamp L310, operated contacts 264, normally closed contacts 251 and 317 to the M lead. This marking operates equipment at the distant end. Also, the marking is used for subsequent pulsing and supervisory functions. Release delay relay 270 energizes direct ground relay 320 over the path from grounded (+) through operated contacts 272, and winding 320A to (−) battery. Relay 320 operates to connect a multiple ground through contacts 321 to busy lamp L320. Relay 320 also connects grounded (+) from normally closed contacts 221, through operated contacts 322 and 121 to low resistance winding 340B, and conductor J313. The resistance of winding 340B is such that a supervisory lamp (not shown) lights in cord circuit CD312, which indicates to operator OP314 that she may transmit digit pulses indicative of the called number. Release delay relay 270 prepares a circuit, through contacts 276, to operate signal relay 220 responsive to grounded (+) markings on the E conductor as they may occur throughout the call.

To prepare for dialing, operator OP314 connects (−) battery to the tip conductor of plug CD311 and jack J310, through operated contacts 126, repeating coil winding RC113, operated contacts 127, winding 130A and grounded (+) through operated contacts 124. Off-normal relay 130 operates over this path and in turn relay 130 closes a circuit to relay 360 extending from grounded (+) (not shown) applied from cord circuit CD312 by operator OP314 to the ring conductor of plug CD311 and then through contacts 129D, winding RC114, contacts 129B, 134, 352, 361 and winding 360A to (−) battery. Relay 360 locks through "*x*" or preliminary operated contacts 363. The circuit to winding 350A is opened at contacts 362. When relay 130 operates it opens the path from grounded (+) through operated contacts 129E, operated contacts 342, resistor R130, contacts 131, 123, winding 260A, contacts 243, 129 and 245 to (−) battery through winding 260B and grounded (+) from the pulsing source at operator OP314, connected over the ring conductor of plug CD 311 and jack J310, is substituted therefore by way of contacts 129D, repeating coil winding RC114, operated contacts 129B, 134, 132, 123, through winding 260A, contacts 243, 129 and 245 to (−) battery through winding 260B.

*Toll line TL103 is opened during pulsing.*—Relay 260 is now adapted to respond to digit pulses successively dialed by operator CD314. These digits will be repeated over the M lead by an intermittent opening and closing of pulsing contacts 264 to break the path extending from (—) battery applied through resistance lamp L310 and contacts 264, 251 and 317. As pulsing relay 260 restores responsive to each digit pulse, shunt relay 110 is operated from grounded (+) through contacts 261 and 273, to (—) battery. When shunt relay 110 operates, it opens contacts 112 and 113 thereby breaking toll line TL103 during pulsing. However, the toll line remains terminated at all times because the equipment through which toll line TL103 is connected might become noisy if it were allowed to remain open; therefore it is terminated throughout this entire portion of the call by its characteristic impedance via the circuit which may be traced from conductor T through toll line equipment TL121, resistor R110, contacts 226, toll line equipment TL121 and conductor R.

Pulse compensation is provided while toll line TL103 is open. That is, pulsing relay 260 is connected to a source of dial pulses by way of the secondary winding of repeat coil RC110. If the primary winding of this coil were permitted to remain open, the characteristics of pulsing relay 260 would be changed and non-standard pulse ratios would result. More particularly, pulses are transmitted over conductor M responsive to the operation of pulsing relay 260. Each time that contacts 263 close responsive to restoration of digit pulse relay 260, a digit pulse is transmitted over conductor M. Shunt relay 110 is operated simultaneously therewith when contacts 261 close. However, it should be noted that some time is required for shunt relay 110 to operate; therefore, for the first brief period of the first digit pulse the inductance of repeat coil RC110 is connected to toll line TL103. This inductance is removed by the operation of shunt relay 110 during the period that the first digit pulse is being produced. This would cause the first digit pulse to have characteristics which are different from the ensuing digit pulses unless repeat coil RC110 presents the same characteristics throughout digit pulsing. To prevent this, shunt relay 110 closes contacts 114 to connect terminating resistance R120 across secondary windings RC111 and RC112, thus returning the circuit to relay 260 to its normal condition. Following the last pulse in each digit pulse train, contacts 261 remain open and shunt relay 110 drops to return trunk TL103 to its normal condition.

Off-normal relay 130 releases after completion of the dialing procedure to restore the original holding circuit for pulsing relay 260. It will be recalled that off-normal relay 130 operated from (—) battery applied to the tip of plug CD311 by operator OP314. She removes this (—) battery at the end of dialing to break the path which formerly extended from that battery over contacts 126, repeat coil winding RC113, contacts 127 and winding 130A, to grounded (+) at contacts 124. Pulsing relay 260 now holds from (—) battery through winding 260B, contacts 245, 129, and 243, winding 260A, contacts 123, 131, resistor R130 to grounded (+) through contacts 342 and 129E.

If the incoming selector at distant office 10 (not shown) is directively stepped to a level on which no idle trunk circuit is available, or stated otherwise, if overflow is encountered, ground interrupted at the rate of 120 times per minute is connected to conductor E1 over dial leg DL110 and through operated contacts 276, to operate signal relay 220 at the rate of 120 I. P. M. This alternately lights and extinguishes a supervisory lamp (not shown) in cord circuit CD312. That is, contacts 221 open and close a path extending from grounded (+) through contacts 221, 322 and 121, low resistance winding 340B, the sleeve of jack J310 and plug CD311, to a lamp (not shown) which will burn when in series with winding 340B but not when in series with winding 340A. It might be well to point out that contacts 322 closed when relay 320 operated. This was when pulsing relay 260 closed contacts 262 to pull release delay relay 270 which in turn closed contacts 272 to operate relay 320 over an obvious circuit.

When the called line is busy, a signal is returned in the form of an audible tone and ground pulses recurring at the rate of 60 times per minute. This alternately lights and extinguishes the supervisory lamp in the cord circuit in the manner explained in the immediately preceding paragraph except at half the rate, i. e., 60 I. P. M.

If the called line is not in use when seized, the called party hears a suitable signal responsive to which he removes his receiver to operate relay 220 from ground on conductor E and the supervisory lamp in cord circuit CD312 is extinguished accordingly. It is relighted when the receiver is replaced by the called party after completion of the conversation.

Upon receiving a supervisory signal at the end of the conversation, operator OP314 takes-down the call by disconnecting plug CD311 and jack J310. This causes sleeves relay 340 to release and, in turn, sleeve slave relay 120 to release. All remaining relay which were operated release at this time. For example, pulsing relay 260 releases when contacts 342 open and contacts 262 open to release relay 270. Contacts 272 are now open and so relay 320 drops.

*False pulse*

Means is provided for reducing to a minimum the number of false pulses which may be transmitted. It may be recalled that digit and supervisory pulses are transmitted from intertoll trunk 200 to the distant office over conductor M by operation of contacts 263 and 264; therefore, it is necessary to prevent false operation of pulsing relay 260 to avoid false pulsing on outgoing calls. Since the operating path of pulsing relay 260 extends over two contacts (123 and 129A) on sleeve slave relay 120, it is seen that only this slave relay need be controlled to avoid all such spurious pulsing. For example, if plug CD311 is quickly reinserted after having once been removed, relay 120 does not immediately reoperate since release delay relay 270 and direct ground relay 320 must fully restore before sleeve slave relay 120 can reoperate over the path extending from grounded (+) through contacts 323, i. e., from contacts 129E through contacts 323 and 342 to (—) battery through relay 120. This precautionary feature is provided to prevent a momentary restoration of pulsing relay 260 and a resultant false pulse. If plug CD311 originally is inserted in such a manner that conductor J313 is momentarily opened to restore sleeve relay 340, sleeve slave relay 120 will not restore—provided the momentary restoration of relay 340 is not of greater time duration than the slow release characteristic of relay 120—again avoiding a false pulse. However, if relay 120 does, responsive to the momentary restoration of relay 340, relay 120 will not reoperate until after relays 270 and 320 fully restore.

While I have shown and described a particular embodiment of my invention, it will be obvious to those skilled in the art that changes and modifications may be made without departing from my invention in its broader aspects. I therefore aim to cover in the appended claims all such changes and modifications as fall within the true spirit and scope of my invention.

What I claim is:

1. In an automatic telephone system, a first exchange comprising an operator position and an outgoing trunk circuit, a distant office, a plurality of talking conductors for interconnecting said distant office and said outgoing trunk circuit, means at said operator position for transmitting switch directing signals over said trunk to said distant exchange, means in said outgoing trunk circuit for opening said talking conductors during signal transmission and means for terminating each side of said talking conductors in their characteristic impedance while open.

2. An automatic telephone system comprising an operator position, an outgoing trunk circuit, a distant office, a toll line interconnecting said distant office and said outgoing trunk circuit, means in said outgoing trunk circuit for transmitting flash supervision over said toll line, means in said outgoing trunk circuit for opening said toll line during said flash supervision and means for terminating each side of said open toll line in its characteristic impedance while open.

3. In an automatic telephone system, a first exchange, an operator position in said first exchange, a distant office, a toll line interconnecting said operator position and said distant office, said toll line comprises two talking conductors and one auxiliary conductor, means at said operator position for transmitting switch directing signals over said auxiliary conductor to said distant office, means at said first exchange for opening said talking conductors during the transmission of said switch directing signals, means for terminating said open talking conductors leading to said distant office and means at said first exchange for compensating for the opening of said toll line conductors.

4. The device of claim 3 wherein said talking conductors normally terminate at said first exchange in a repeat coil having first and second windings, said means for opening said talking conductors comprising means for opening the circuit leading to said first windings, said compensating means comprises means for connecting a terminating impedance across said first winding, and said transmitting means comprises a relay connected to said second windings.

5. A pulse correcting trunk circuit comprising incoming and outgoing talking conductors, a repeat coil for inductively connecting said incoming and outgoing talking conductors, means for transmitting digit pulses into said trunk circuit over said incoming talking conductors, means responsive to said incoming digit pulses for transmitting outgoing digit pulses, means responsive to the first digit pulse in each incoming pulse train for disconnecting said repeat coil from said outgoing talking conductors, and means simultaneously operative therewith for terminating said repeat coil in simulation of said outgoing talking conductors.

6. The trunk circuit of claim 5 and means for terminating said outgoing conductors during the time that said repeat coil is disconnected.

7. A pulse correcting trunk circuit comprising incoming and outgoing talking conductors, a repeat coil for interconnecting said incoming and outgoing talking conductors, means for transmitting digit pulses over said incoming conductors to said trunk circuit, means responsive to said incoming digit pulses for transmitting outgoing pulses from said trunk circuit, means responsive to the first digit pulse for opening said outgoing conductors thereby to prevent the transmission of digit pulses over said outgoing conductors, and means effective simultaneously with the opening of said outgoing conductors for maintaining a characteristic impedance across said incoming conductors whereby said digit pulses all have similar characteristics.

8. The trunk circuit of claim 7 wherein said last named means comprises a resistor connected in series with that portion of the repeat coil which formerly was connected with said outgoing talking conductors.

9. The pulse correcting trunk circuit of claim 8 and means for terminating said outgoing trunk conductors with their characteristic impedance.

References Cited in the file of this patent

UNITED STATES PATENTS

| | | |
|---|---|---|
| 2,516,645 | Powell | July 25, 1950 |
| 2,603,717 | Molnar | July 15, 1952 |